United States Patent
Breuer et al.

(10) Patent No.: US 8,154,213 B2
(45) Date of Patent: Apr. 10, 2012

(54) CIRCUIT ARRANGEMENT AND METHOD FOR OPERATING A HIGH-PRESSURE DISCHARGE LAMP

(75) Inventors: Christian Breuer, Newburyport, MA (US); Kai Wolter, Berlin (DE)

(73) Assignee: OSRAM AG, München (DE)

( * ) Notice: Subject to any disclaimer, the term of this patent is extended or adjusted under 35 U.S.C. 154(b) by 438 days.

(21) Appl. No.: 12/524,720

(22) PCT Filed: Jan. 25, 2007

(86) PCT No.: PCT/EP2007/050713
§ 371 (c)(1),
(2), (4) Date: Jul. 27, 2009

(87) PCT Pub. No.: WO2008/089846
PCT Pub. Date: Jul. 31, 2008

(65) Prior Publication Data
US 2010/0079735 A1 Apr. 1, 2010

(51) Int. Cl.
*H05B 37/02* (2006.01)
(52) U.S. Cl. .......................... 315/223; 315/224; 315/308
(58) Field of Classification Search .................. 315/224, 315/219, 223, 307, 308, 209 R, DIG. 5, DIG. 7, 315/DIG. 2
See application file for complete search history.

(56) References Cited

U.S. PATENT DOCUMENTS

| | | | |
|---|---|---|---|
| 5,706,061 A | 1/1998 | Marshall et al. | |
| 5,754,249 A | 5/1998 | Zhaog | |
| 6,392,717 B1 | 5/2002 | Kunzman | |
| 6,504,323 B2 * | 1/2003 | Yuda et al. | 315/307 |
| 7,365,497 B2 * | 4/2008 | Fukuda et al. | 315/209 T |
| 7,567,041 B2 * | 7/2009 | Okamoto | 315/292 |
| 2005/0128775 A1 | 6/2005 | Fukumoto | |

FOREIGN PATENT DOCUMENTS

| | | |
|---|---|---|
| EP | 0 749 248 | 12/1996 |
| EP | 1 569 466 | 8/2005 |
| WO | WO 2005/120138 | 12/2005 |
| WO | WO 2006/056926 | 6/2006 |

* cited by examiner

*Primary Examiner* — David Hung Vu
(74) *Attorney, Agent, or Firm* — Cozen O'Connor

(57) ABSTRACT

A circuit arrangement (10) for operation of a high-pressure discharge lamp having a commutation device (K), which has an input (E1, E2) for coupling to a DC voltage source and has an output (A1, A2) for coupling to the high-pressure discharge lamp (EL). A control apparatus (12) is configured to commutate the polarity with which the voltage ($U_{ZW}$), which is applied to the input (E1, E2) of the commutation device (K), is coupled to the output (A1, A2) of the commutation device (K). A synchronization apparatus (14) is configured to provide a synchronization signal (Sy) at its output (A1, A2). A timer apparatus (16) is configured to produce a commutation initiation signal (KA) at its output (A1, A2), which commutation initiation signal (KA) is synchronized with a predeterminable operating frequency of the high-pressure discharge lamp (EL). A pattern apparatus (18) stores a choice of possible commutation times, with the choice of the possible commutation times being synchronized in time to the synchronization signal (Sy).

14 Claims, 3 Drawing Sheets

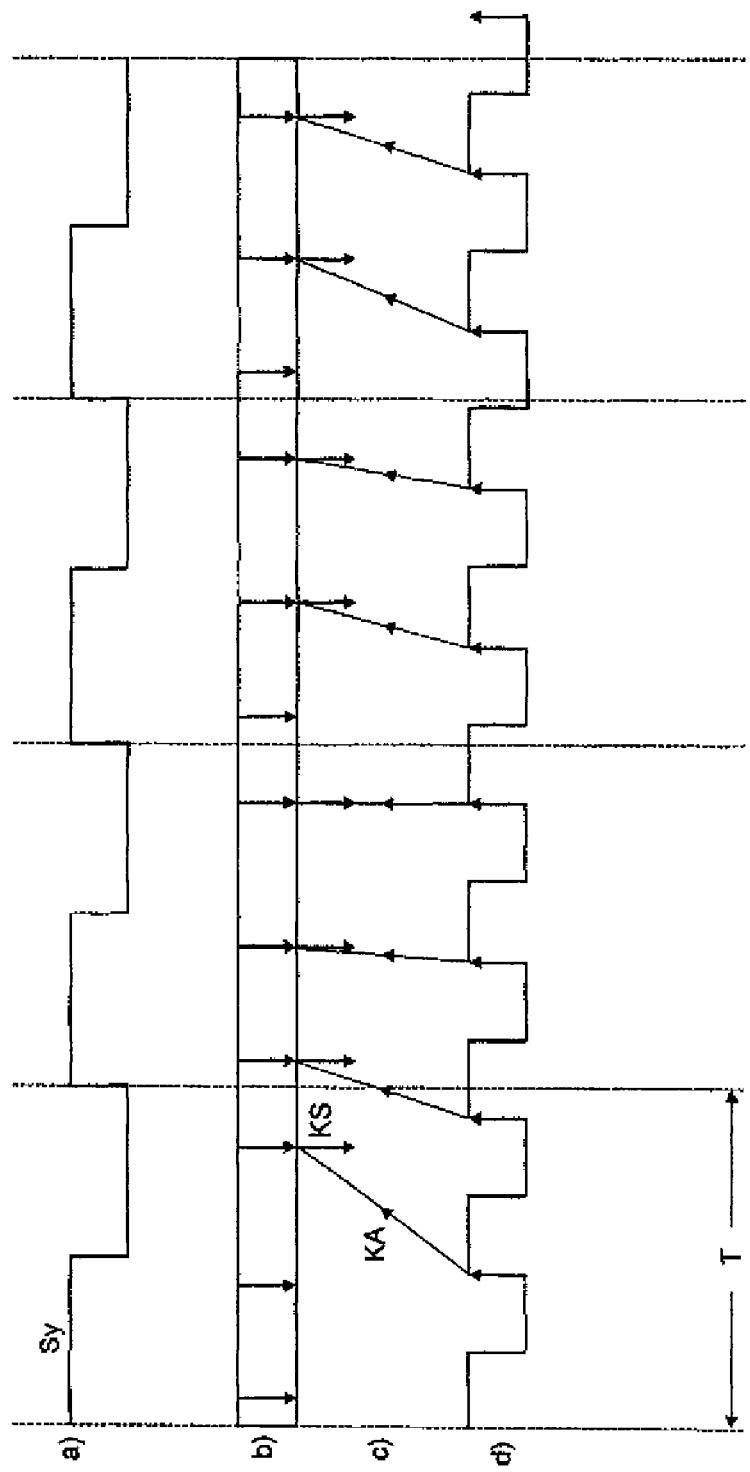

US 8,154,213 B2

CIRCUIT ARRANGEMENT AND METHOD FOR OPERATING A HIGH-PRESSURE DISCHARGE LAMP

RELATED APPLICATIONS

This is a U.S. national stage of application No. PCT/EP2007/050713, filed on Jan. 25, 2007.

FIELD OF THE INVENTION

The present invention relates to a circuit arrangement for operation of a high-pressure discharge lamp having a commutation device, which has an input for coupling to a DC voltage source and has an output for coupling to the high-pressure discharge lamp, with the commutation device being designed to couple the voltage which is applied to the input to its output, a control apparatus, which is designed to commutate the polarity with which the voltage, which is applied to the input of the commutation device, is coupled to the output of the commutation device, and a synchronization apparatus, which is designed to provide a synchronization signal at its output. The invention furthermore relates to a projection device having a circuit arrangement such as this, to a corresponding method for operation of a high-pressure discharge lamp on a circuit arrangement such as this and, finally, to a computer program product for carrying out the steps of the method that has been mentioned.

BACKGROUND OF THE INVENTION

Circuit arrangements of this generic type are used, for example, for projection devices which, furthermore, have a color wheel which rotates at a specific frequency. This frequency is normally coupled to the video frequency, which is 48 images per second in Europe and is 63 images per second in the United States. The color wheel is normally rotated at two to four times the video frequency, correspondingly at about 96 to 252 revolutions per second in the case of said examples.

This procedure is illustrated in FIG. 1. In this case, FIG. 1c shows the period duration T. According to the train of curves 1a, a period duration T in the present case comprises three revolutions of the color wheel, with the color sequences R for red, G for green and B for blue being repeated three times in the present case. Color segment changes may be considered as commutation times. In this case, the so-called light valve is switched off briefly in order that no two mixed colors are created in the projection. This switched-off time is used for commutation. The train of curves 1b indicates the actually chosen commutation times. The lamp current is commutated. In this case, two commutation processes are required for one full current period.

The sequence of commutation times shown in FIG. 1b is repeated periodically. This results on average in a commutation frequency of 3 times the video image sequence, in the exemplary embodiment, accordingly, 3×48 Hz=144 Hz for the European video image sequence. If two commutation processes are now required for one complete current period, this accordingly results in a lamp operating frequency of 144 Hz/2=72 Hz. This therefore results in a proportionality factor of 72 Hz/48 Hz=1.5 with respect to the video frequency.

In the event of an increase to four color wheel revolutions per period duration T, this accordingly results in a proportionality factor of 2. The lamp operating frequency is accordingly coupled to the video frequency via this proportionality factor. In this case, however, each lamp has its own optimum lamp operating frequency. This allows operation without flickering, the formation of a stable arc, and high stability of the electrodes throughout their life.

This results in two problems: even if a projection device in which a circuit arrangement such as this is used is designed optimally for European ratios, that is to say the lamp is operated at its optimum lamp operating frequency, then a system such as this is not suitably designed for operation in the United States. On the other hand, only fixed proportionality factors can be set. If an optimum lamp operating frequency with a proportionality factor of 1.5 were now to result, then this could not be achieved by the means from the prior art.

SUMMARY OF THE INVENTION

One object of the present invention is to develop a circuit arrangement of the type mentioned above such that the high-pressure discharge lamp can be operated at an optimum lamp operating frequency, irrespective of the video image frequency. Other objects involve providing a corresponding projection device, a corresponding method for operation of a high-pressure discharge lamp, and a computer program product for carrying out the steps of the method that has been mentioned.

In accordance with one aspect of the present invention, the above object can be achieved if a circuit arrangement of the above-described known type has a timer apparatus and a pattern apparatus added to it. In this case, the timer apparatus is designed to produce a commutation initiation signal at its output, which commutation initiation signal is synchronized with a predeterminable operating frequency, preferably with the optimum lamp operating frequency, of the high-pressure discharge lamp. A choice of possible commutation times is stored in the pattern apparatus, with the choice of the possible commutation times being synchronized in time to the synchronization signal. The pattern apparatus has an input which is coupled to the output of the timer apparatus, for transmission of the commutation initiation signal. In this case, the pattern apparatus is designed to couple a commutation control signal to the control apparatus, in order to produce commutation at the next commutation point in time from the choice of commutation times, on reception of a commutation initiation signal.

In this case, the synchronization signal is preferably synchronized to the frames of a video signal and is therefore independent of the predeterminable operating frequency of the high-pressure discharge lamp. Accordingly, although the possible commutation times are synchronized to the video signal in the pattern apparatus, these commutation times are not repeated periodically, however. In fact, the optimum lamp operating frequency is reflected in the timer apparatus, and is now used to choose suitable commutation times from the choice of commutation times as are stored in the pattern apparatus. This makes it possible to vary the chosen commutation times from period to period, with respect to one period of the video signal. This on the one hand allows very much finer proportionality factors to be selected than in the prior art, thus allowing the high-pressure discharge lamp to be operated at the optimum lamp operating frequency, irrespective of the video frequency in the corresponding country. This results in higher light yield, a higher efficiency, operation with less flicker, a maximum lamp life and the like, depending on the criterion used to choose the optimum lamp operating frequency.

As already mentioned, the synchronization apparatus preferably has an input to which a video signal, which is subdivided into frames, can be coupled, with the synchronization apparatus being designed to provide the synchronization signal synchronized to the frames of the video signal. This advantageously allows the system to be used universally. This is because the frequency of the synchronization signal is derived directly from the frequency of the video signal. Nevertheless, as before, the timer apparatus is synchronized with an optimum operating frequency of the high-pressure discharge lamp. This means that the lamp is operated, as before, at the optimum operating frequency, irrespective of the frequency of the video signal which is connected to the input of the synchronization apparatus.

A further preferred embodiment furthermore has a DC component measurement apparatus, which is designed to determine and to provide the actual value of the DC component of the signal which is provided at the output of the commutation device.

A circuit arrangement according to an embodiment of the invention comprises a nominal-value preset apparatus, via which a nominal value of the DC component of the signal which is provided at the output of the commutation device can be defined, and a regulation apparatus, which on the one hand is coupled to the pattern apparatus and on the other hand is coupled to the DC component measurement apparatus and to the nominal-value preset apparatus in order to supply the actual value and the nominal value of the DC component of the signal which is provided at the output of the commutation device, which regulation apparatus is designed to modify the output of the commutation control signal, in particular by delaying it or eliminating it, such that the magnitude of the difference between the actual value and the nominal value of the DC component of the signal which is provided at the output of the commutation device is below a predeterminable threshold value. These measures take account of the following circumstance: in the method which has been developed by the applicant and is known by the title "Unishape", the amplitudes, which are associated with the individual colors, of the signal that is used to drive the high-pressure discharge lamp are varied. This makes it possible to achieve considerably higher resolutions and better color intensities. If the commutation times were now to be varied from period to period, this would result in a risk that the signal driving the lamp could not be free of any direct-current component overall when driving in accordance with the Unishape method. A DC component could lead to non-uniform growth of electrode tips, and could thus cause problems which, for example, are explained in U.S. Pat. No. 5,608,294, WO 03/098979 A1 and DE 198 29 600 A1. Because of this, one embodiment provides that the nominal value which is provided by the nominal-value preset apparatus is equal to zero. However, the measure according to an embodiment of the invention also makes it possible to take account of systems in which electrodes are subject to widely differing loads by virtue of the system design, for example as a result of back-reflection of thermal radiation. In this situation, it has been found to be particularly advantageous for the nominal value which is provided by the nominal-value preset apparatus to be not equal to zero, in order in this way to ensure that the electrodes are equally loaded.

In a further preferred embodiment, the nominal-value preset apparatus is designed to dynamically vary the nominal value, with the nominal-value preset apparatus in particular being coupled to a temperature measurement apparatus and/or to an electrode-tip measurement apparatus. This makes it possible to vary the nominal value dynamically with respect to temperature changes or to tip growth that is found on the electrodes, in order in this way to optimize the lamp operation even further.

The predeterminable operating frequency is preferably a lamp-specific operating frequency, in particular an operating frequency which is optimum for that lamp. The predeterminable operating frequency may, however, also be chosen as a function of at least one lamp parameter, for example optimized with respect to the life, the efficiency, the susceptibility to flicker, etc.

In one preferred embodiment of a projection device according to the invention, which comprises a color wheel and a drive apparatus for the color wheel, the drive apparatus for the color wheel is designed to rotate the color wheel such that the rotation is synchronized with the synchronization signal. Assuming that the synchronization signal is obtained from the video signal, the rotation of the color wheel is therefore matched to the video signal. The commutation times are chosen independently thereof, as already described in conjunction with the embodiments of a circuit arrangement according to the invention.

The preferred embodiments which are disclosed in conjunction with the circuit arrangement according to an aspect of the invention, and their advantages, apply in a corresponding manner, to the extent that they are applicable, to the projection device, to the method, and to the computer program product according to other aspects of the invention.

BRIEF DESCRIPTION OF THE DRAWING(S)

One exemplary embodiment of a circuit arrangement according to the invention and of a projection device according to the invention will now be described below in more detail with reference to the attached drawings, in which:

FIG. 3 shows the time sequence of various signals for a circuit arrangement according to the invention.

PREFERRED EMBODIMENT OF THE INVENTION

Figure 1:
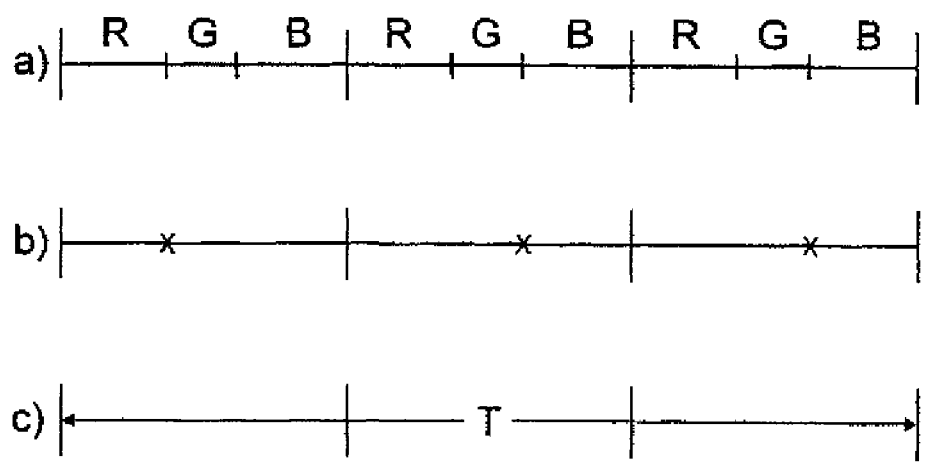
FIG. 1 shows the color sequence over time of one period, which comprises three revolutions of the color wheel, for a circuit arrangement according to the prior art, as well as the commutation times chosen therein.
Figure 2:
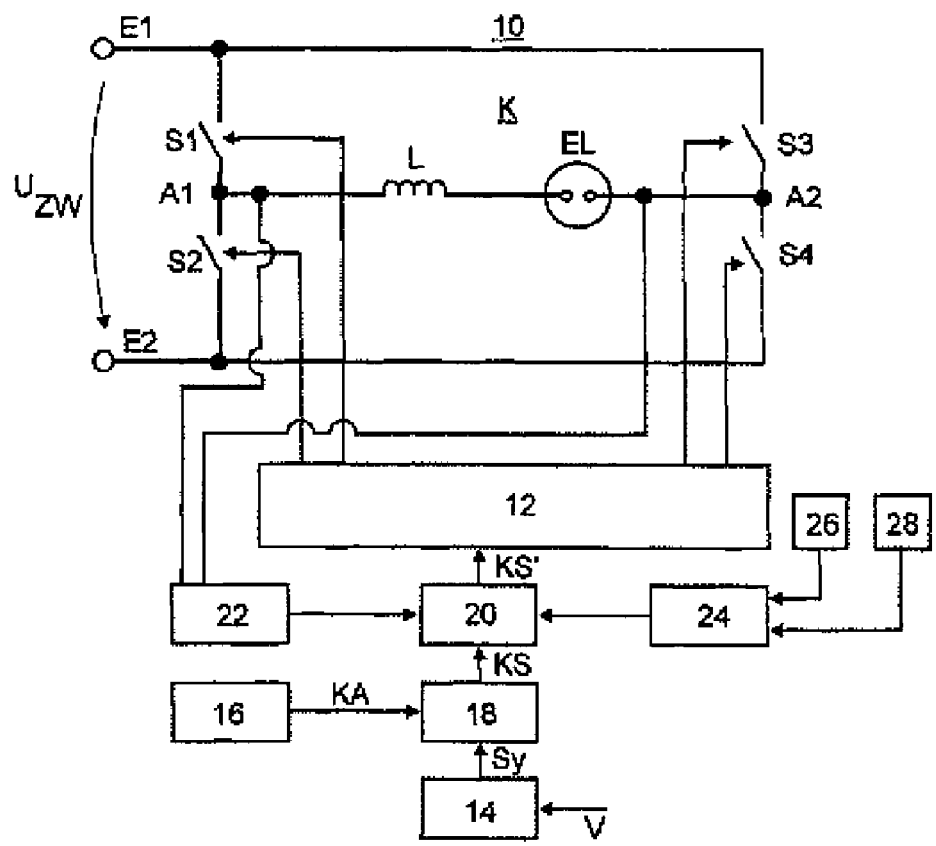
FIG. 2 shows a schematic illustration of the design of a circuit arrangement according to the invention.

FIG. 2 shows a schematic illustration of the design of a circuit arrangement 10 according to the invention. This circuit arrangement 10 comprises a commutation device K, which comprises the switches S1, S2, S3, S4, with these switches forming a full-bridge arrangement in the present case. The commutation device K has an input which comprises the two input connections E1 and E2, as well as an output which comprises the two output connections A1 and A2. The series circuit of a lamp inductor L and a high-pressure discharge lamp EL is coupled between the two output connections A1 and A2. The four switches S1 to S4 are controlled by a control apparatus 12 such that the switches S1 and S4 on the one hand and the switches S2 and S3 on the other hand are switched on alternately. The polarity with which the voltage $U_{ZW}$ which is applied to the input of the commutation device K, normally the so-called intermediate-circuit voltage, is coupled to the output of the commutation device K is thus commutated.

The circuit arrangement further comprises a synchronization apparatus 14 which provides a synchronization signal Sy at its output. In the present case, a video signal V which is subdivided into frames is supplied to the input of the synchronization apparatus 14, with the synchronization apparatus 14 being designed to provide the synchronization signal Sy synchronized to the frames of the video signal V.

The circuit arrangement shown in FIG. 2 furthermore comprises a timer apparatus 16 which provides a commutation initiation signal KA at its output, which commutation initiation signal KA is synchronized with a predeterminable operating frequency of the high-pressure discharge lamp EL. This predeterminable operating frequency may be a lamp-specific operating frequency, although it could also be chosen as a function of at least one lamp parameter, for example a low flicker tendency, a life which is as long as possible, high efficiency or the like. The commutation initiation signal KA is supplied to a pattern apparatus 18 which, furthermore, is supplied with the output signal Sy from the synchronization apparatus 14.

A choice of possible commutation times is stored in the pattern apparatus 18, with the choice of the possible commutation times being synchronized in time to the synchronization signal Sy. The pattern apparatus 18 has an input which is coupled to the output of the timer apparatus 16, for transmission of the commutation initiation signal KA. The pattern apparatus 18 is designed to output a commutation control signal KS, in order to produce commutation at the next commutation point in time from the choice of commutation times, on reception of a commutation initiation signal. Only a specific choice of color transitions may be considered as commutation times, since commutation times must satisfy specific criteria. For example, with regard to optimum lamp operation, color transitions are chosen which are distinguished by a high amplitude. However, certain color transitions cannot be used for an optimum projection result since so-called ringing can be recognized with certain color transitions, that is to say a so-called transient process. This is undesirable.

In the exemplary embodiment in FIG. 2, the output signal KS from the pattern apparatus 18 is supplied to a regulation apparatus 20. This receives on the one hand the actual value of the DC component of the signal which is provided at the output of the commutation device K from a DC component measurement apparatus 22, as well as a nominal value for this DC component from a nominal-value preset apparatus 24. The regulation apparatus 20 is designed to modify the output of the commutation control signal, in particular by delaying it or eliminating it, such that the magnitude of the difference between the actual value and the nominal value of the DC component of the signal which is provided at the output of the commutation device K is below a predeterminable threshold value. The signal which is emitted from the regulation apparatus 20 to the control apparatus 12 is annotated KS'.

The nominal-value preset apparatus 24 may be designed to preset a constant nominal value which, for example, may be equal to zero, or may not be equal to zero, in order to take account of non-uniform heating of the electrode tips and the like. The nominal-value preset apparatus 24 is particularly preferably designed to dynamically vary the nominal value. In the present case, for this purpose, the nominal-value preset apparatus 24 is coupled to a temperature measurement apparatus 26 and to an electrode-tip measurement apparatus 28. Accordingly, if it is found that the two electrodes in the high-pressure discharge lamp EL are at a different temperature, which can lead to non-uniform wear of the electrodes, or it is found that the tips grown on the electrodes are of non-uniform size, then this is taken into account by the nominal-value preset apparatus 24 when presetting the nominal value for the regulation apparatus 20.

FIG. 3 shows a schematic illustration of the time sequence of various signals for the exemplary embodiment of a circuit arrangement according to the invention as shown in FIG. 2. Curve train a) first of all shows the time sequence of the synchronization signal Sy which is provided by the synchronization apparatus 14. This synchronization signal Sy is synchronized with the video signal V. Curve train b) shows the choice of possible commutation times stored in the pattern apparatus 18. As can clearly be seen, these are synchronized with the synchronization signal Sy. A period duration T can be seen, which indicates that this choice is repeated cyclically, a total of four times in the illustration shown in FIG. 3. Curve train d) shows the time profile of the signal which is provided by the timer apparatus 16 and which is synchronized with a predeterminable operating frequency of the high-pressure discharge lamp—and not with the video signal V. In the present case, see curve train c), a commutation initiation signal KA is produced and is supplied to the pattern apparatus 18 on each rising flank. The pattern apparatus 18 then produces a commutation control signal KS, see curve train b), at the next commutation point in time from the choice of commutation times, and passes this to the control apparatus 12, in order to produce commutation. On average, this procedure results in the high-pressure discharge lamp EL being operated at the predeterminable operating frequency of the high-pressure discharge lamp EL, to be precise independently of the frequency of the video signal V.

Figure 4:
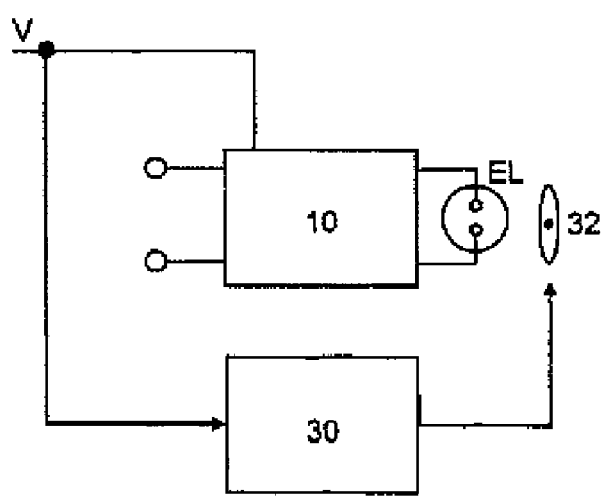
FIG. 4 shows a schematic illustration of the design of a projection device according to the invention.

FIG. 4 shows a schematic illustration of the design of a projection device according to the invention. This comprises a circuit arrangement 10 according to the invention and a drive apparatus 30 for a color wheel 32. Both the circuit arrangement 10 according to the invention and the drive apparatus 30 for the color wheel 32 are supplied with the video signal V, in order to drive them such that the rotation of the color wheel 32 is synchronized with the video signal V.

In one preferred exemplary embodiment, a plurality, and even more preferably all, of the following components and signals shown in FIG. 2 are in the form of software, and can be run as a computer program in a microcontroller. These are the synchronization apparatus 14 which provides the synchronization signal Sy, the timer apparatus 16 which provides the commutation initiation signal KA, the pattern apparatus 18 which provides the commutation control signal KS, the DC component measurement apparatus 22, the regulation apparatus 20, the nominal-value preset apparatus 24 and the control apparatus 12.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A circuit arrangement for operation of a high-pressure discharge lamp comprising:
    a commutation device, which has an input for coupling to a DC voltage source and has an output for coupling to the high-pressure discharge lamp, with the commutation device being configured to couple the voltage which is applied to the input to its output;
    a control apparatus, which is configured to commutate the polarity with which the voltage, which is applied to the input of the commutation device, is coupled to the output of the commutation device;
    a synchronization apparatus, which is configured to provide a synchronization signal at its output;
    a timer apparatus which is configured to produce a commutation initiation signal at its output, which commutation initiation signal is synchronized with a predeterminable operating frequency of the high-pressure discharge lamp; and a pattern apparatus, in which a choice of possible commutation times is stored, with the choice of the possible commutation times being synchronized in time to the synchronization signal, with the pattern apparatus having an input which is coupled to the output of the timer apparatus, for transmission of the commutation initiation signal, with the pattern apparatus being configured to couple a commutation control signal to the control apparatus, in order to produce commutation at the next commutation point in time from the choice of commutation times, on reception of a commutation initiation signal.

2. The circuit arrangement as claimed in claim 1,
wherein the synchronization apparatus has an input adapted to be coupled to a video signal, which is subdivided into frames, with the synchronization apparatus being configured to provide the synchronization signal synchronized to the frames of the video signal.

3. The circuit arrangement as claimed in claim 1, wherein the circuit arrangement furthermore comprises a DC component measurement apparatus, which is configured to determine and to provide the actual value of the DC component of the signal which is provided at the output of the commutation device.

4. The circuit arrangement as claimed in claim 3, wherein the circuit arrangement comprises a nominal-value preset apparatus configured to define a nominal value of the DC component of the signal which is provided at the output of the commutation device, and a regulation apparatus, which on the one hand is coupled to the pattern apparatus and on the other hand is coupled to the DC component measurement apparatus and to the nominal-value preset apparatus in order to supply the actual value and the nominal value of the DC component of the signal which is provided at the output of the commutation device, which regulation apparatus is configured to modify the output of the commutation control signal such that the magnitude of the difference between the actual value and the nominal value of the DC component of the signal which is provided at the output of the commutation device is below a predeterminable threshold value.

5. The circuit arrangement as claimed in claim 4, wherein the nominal value which is provided by the nominal-value preset apparatus is equal to zero.

6. The circuit arrangement as claimed in claim 4,
wherein the nominal value which is provided by the nominal-value preset apparatus is not equal to zero.

7. The circuit arrangement as claimed in claim 4, wherein the nominal-value preset apparatus is configured to dynamically vary the nominal value, with the nominal-value preset apparatus being coupled to a temperature measurement apparatus and/or to an electrode-tip measurement apparatus.

8. The circuit arrangement as claimed in claim 1, wherein the predeterminable operating frequency is a lamp-specific operating frequency.

9. The circuit arrangement as claimed in claim 1, wherein the predeterminable operating frequency is chosen as a function of at least one lamp parameter.

10. A projection device having a circuit arrangement as claimed in claim 1.

11. The projection device as claimed in claim 10, wherein the projection device comprises a color wheel and a drive apparatus for the color wheel, with the drive apparatus for the color wheel being configured to rotate the color wheel such that the rotation is synchronized with the synchronization signal.

12. A method for operation of a high-pressure discharge lamp on a circuit arrangement having a commutation device, which has an input for coupling to a DC voltage source and has an output for coupling to the high-pressure discharge lamp, with the commutation device being configured to couple the voltage which is applied to the input to its output; a control apparatus, which is configured to commutate the polarity with which the voltage, which is applied to the input of the commutation device, is coupled to the output of the commutation device; a synchronization apparatus, which is configured to provide a synchronization signal at its output; a timer apparatus which is configured to produce a commutation initiation signal at its output, which commutation initiation signal is synchronized with a predeterminable operating frequency of the high-pressure discharge lamp; a pattern apparatus, in which a choice of possible commutation times is stored, with the choice of the possible commutation times being synchronized in time to the synchronization signal, wherein the method comprises the steps of:

a) output of a commutation initiation signal by the timer apparatus;
b) reception of the commutation initiation signal by the pattern apparatus;
c) coupling of a commutation control signal to the control apparatus at the next commutation point in time from the choice of commutation times; and
d) driving of the commutation device by the control apparatus in order to produce commutation.

13. A computer program product which can be loaded in the internal memory of a digital computer and comprises software code sections by means of which the steps as claimed in claim 12 are carried out when the product runs on a computer.

14. The circuit arrangement as claimed in claim 4, wherein the regulation apparatus is configured to modify the output of the commutation control signal by delaying it or eliminating it.

* * * * *